May 16, 1944.　　　H. C. FRENCH ET AL　　　2,348,801
WHEEL AND AXLE ASSEMBLY
Filed Dec. 26, 1942
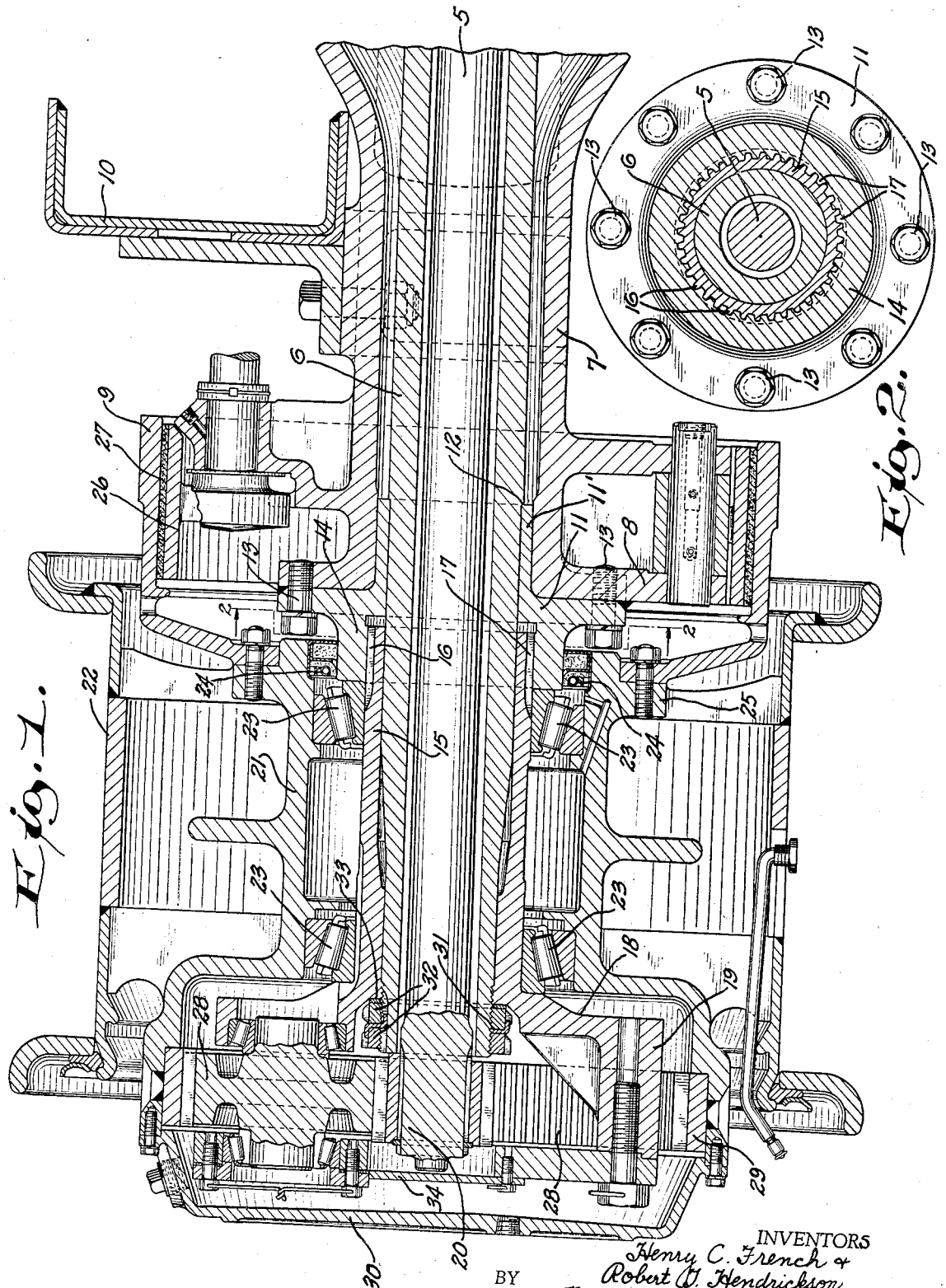
INVENTORS
Henry C. French &
Robert W. Hendrickson,
BY Morsell & Morsell
ATTORNEYS.

Patented May 16, 1944

2,348,801

UNITED STATES PATENT OFFICE 2,348,801

WHEEL AND AXLE ASSEMBLY

Henry C. French, Elm Grove, Wis., and Robert T. Hendrickson, Chicago, Ill.; said French assignor to The Heil Co., Milwaukee, Wis., a corporation of Wisconsin Application December 26, 1942, Serial No. 470,260

4 Claims. (Cl. 180—75)

This invention relates to improvements in wheel and axle assemblies.

A general object of the invention is to provide an inexpensive and efficient, but easily manufactured multiple pinion reduction wheel and axle assembly adapted for incorporation in heavy duty trucks, tractors, and wheeled vehicles which require relatively large total rear axle reductions.

A more specific object of the invention is to provide a wheel and axle assembly of the character described wherein a portion of the axle assembly carries a collar which serves to hold a tubular load carrying axle in proper longitudinal position, and which also serves, through a spline connection, to prevent a telescopically mounted gear spider from rotating.

Another specific object of the invention is to provide, in a wheel and axle assembly of the character described, a collar member which serves to non-rotatably anchor a telescopically mounted gear spider directly to the axle housing, whereby the structure is extremely rigid and strong.

Another specific object of the invention is to provide a wheel and axle assembly wherein roller bearings are interposed between the wheel and the gear spider with provision for easily adjusting said bearings.

Still another specific object of the invention is to provide a wheel and axle assembly incorporated in a self-propelled vehicle, wherein the assembly is exteriorly accessible without any dismantling of the axle, and wherein adjustments and replacement of parts is easily accomplished with the vehicle in a normal position without the necessity of jacking up said wheel.

A further object of the invention is to provide a wheel and axle assembly which is of very simple construction, is strong and durable, is relatively inexpensive and easy to manufacture, and which is well adapted for the purposes set forth.

With the above and other objects in view the invention consists of the improved wheel and axle assembly, and their parts and combinations as set forth in the claims, and all equivalents thereof.

In the accompanying drawing in which the same reference characters indicate the same parts in both of the views:

Fig. 1 is a fragmentary, longitudinal sectional view of the wheel-carrying portion of the improved wheel and axle assembly as provided for a truck; and Fig. 2 is a transverse sectional view taken on line 2—2 of Fig. 1.

Referring now more particularly to the drawing it will appear that the improved wheel and axle assembly includes an inner, relatively small diameter torsional axle designated generally by the numeral 5 which extends between the opposite rear driving wheels of a heavy duty truck, tractor, or similar self-propelled wheeled vehicle. The torsional axle 5 is formed of two endwise abutting sections which meet and abut within a standard differential carrier (not shown). In the drawing the assembly of parts on only one side is illustrated and will be referred to inasmuch as the assembly on the opposite side duplicates the structure illustrated and described.

A section of the torsional axle 5 is revolubly enclosed by a load-carrying axle section 6. Said load-carrying axle section, inwardly of the axle assembly, is enclosed by a housing 7. One end portion of the housing is secured to a side of the differential carrier, and the other end portion of the housing, which is flanged as at 8, extends into a brake drum 9. Intermediate portions of the housing 7 carry supports 10 affording connections between the axle assembly and the chassis (not shown) of the vehicle.

An important feature of the present invention is a collar 11 which has a tubular portion 11' surrounding an outer extension of the load-carrying axle 6. This portion of the collar has a pressed fit with the enclosed portion of the load carrying axle to prevent rotation and axial movement. It will be observed that the load-carrying axle is provided with an annular external shoulder 12 with which the inner end of the tubular portion 11' of the collar is in abutment. Through this abutment, when the parts are properly secured and adjusted, the tubular load-carrying axle is securely held in its proper longitudinal position relative to the other elements of the assembly. The collar 11 is formed with an annular flange which is secured to the flange 8 of the axle housing 7 by a plurality of bolts 13. An outward tubular extension 14 of the collar 11 is spaced from the load-carrying axle 6 and there is interposed between said portion of the collar and the load-carrying axle an inner end portion of a telescopic spider 15. The adjacent surfaces of the collar portion 14 and the spider 15 have milled or machined thereon complementary meshing spline elements 16 and 17 respectively.

The telescopic spider 15 has an enlarged outer head portion 18 with angularly separated ears 19 integral therewith. The central portion of the spider head 18 is provided with a circular opening through which the outer end of the torsional axle section 5 is extended, with the extended portion of said torsional axle having integral thereon a driving pinion 20.

Spacedly surrounding the telescopic sleeve portion of the spider 15, and adapted to revolve relative thereto, is the hub portion 21 of a wheel 22. Between said hub portion 21 of the wheel and the sleeve portion of spider 15, are sets of adjustable roller bearings 23. The space between the hub 21 and the spider sleeve 15 is adapted to be filled with a lubricant and is sealed by grease and oil seal members 24.

The inner head plate 25 of the wheel has bolted thereto the brake drum 9 previously referred to. The brake drum 9 will revolve with the wheel 22 relative to the load-carrying axle 6. The improved wheel and axle assembly permits the use of a standard form of brake wherein a shoe 26 is operable in the usual manner to cause frictional application of a brake lining 27 to the inner surface of the drum 9.

The ears 19 of the spider head 18 have revolubly mounted thereon idler pinions 28 which mesh with the central driving pinion 20. The idler pinions 28 additionally mesh with the teeth of a large ring gear 29 which is carried fast by the inner annular wall of an extended drum portion of the wheel 22. The end portion of the entire assembly is closed by an outer cover plate 30 removably bolted to the end of the wheel extension drum portion.

The outer end of the load-carrying axle 6 is slightly reduced and is externally threaded as at 31. This portion of the load-carrying axle projects into a suitable recess within the head portion of the spider. Said threaded portion 31 of the load carrying axle removably and adjustably carries locking and adjustment nuts 32. These nuts are normally drawn up so as to impinge against an annular shoulder 33 formed in a portion of the spider and serve to retain the spider in a proper position of longitudinal adjustment on the load-carrying axle and to retain the splines 16 of the spider in engagement with the complementary splines 17 of the collar portion 14. Additionally the proper position of the load-carrying axle 6 is assured by the abutment of the inner end of the collar portion 11' with the axle shoulder 12. Through the means described it is also possible to effect axial adjustments of the wheel 22 and adjustments of the wheel bearings 23.

Interiorly of the outer plate 30 is a smaller plate 34 which is removably attached to the end of the inner assembly by bolts. Said plate 34 covers the end portion of the driving pinion 20 and serves as a thrust plate for the inner torsional axle 5.

The operation of the improved wheel and axle assembly should be apparent from the description. Power is transmitted to the small diameter torsional axle 5 whereby the driving pinion 20 at the outer end of the same is turned. Power is transmitted at the desired rate of speed from the driving pinion 20, through the intermediate pinions 28, to the large ring gear 29. The latter is integral with the wheel 22. As a result, the wheel is revolved on the sleeve portion of the spider 15 which surrounds the outer end portion of the load-carrying axle 6, but the spider is prevented from rotation by virtue of its splined engagement with the anchored collar 11. A particular advantage of the construction is the non-rotatable securement of the spider sleeve directly to the collar 11, which in turn is securely anchored directly to the axle housing. The latter provides a large and rigid surface for this anchorage. A dual function is performed by the collar 11. It provides the effective positive anchorage for the spider sleeve, as before mentioned, while permitting axial adjustments of the spider through the splines 16 and 17, and it also, through the abutment with the shoulder 12, holds the tubular load-carrying axle 6 securely in position.

In making adjustments and replacement of parts it is not necessary to jack up the wheel of the tractor, and the same may remain in its normal ground-engaging position. For adjustments or parts replacements, it is only necessary to remove the plates 30 and 34, whereupon the telescopically related parts may be withdrawn outwardly and access may be had to the adjusting nuts 32.

From the foregoing description it will appear that the improved wheel and axle assembly is of simple and efficient construction, provides for great rigidity and strength, while permitting access to and adjustment of parts, and is well adapted for the purposes described.

What is claimed as the invention is:

1. A wheel and axle assembly, comprising a tubular, fixedly mounted axle housing, a collar secured to the housing and having a sleeve extending therewithin, a tubular outer axle non-rotatably extended through said collar and sleeve, an external portion of said outer axle being formed with a shoulder in abutment with an end of said collar sleeve to prevent axial displacement of said outer axle, a spider telescopically enclosing the outer end portion of said outer axle and having a splined connection with said collar, a wheel revolubly mounted on said spider, a driven inner axle extending revolubly through said outer axle, and motion transmitting means between the outer end of said inner axle and the wheel.

2. A wheel and axle assembly, comprising a tubular outer axle having a positive shoulder, a fixedly mounted axle housing spacedly surrounding a portion of the outer axle, a collar removably anchored to the housing and having a tubular sleeve portion of one diameter tightly embracing a portion of the outer axle within the housing and having an end thereof abutting said outer axle shoulder, said collar having a tubular portion of a second diameter, a spider telescopically enclosing another portion of the outer axle and extending into the last-mentioned collar portion and having an internal splined connection therewith, a wheel revolubly mounted on said spider, a driven inner axle extending revolubly through said outer axle, and motion transmitting means between the outer end of said inner axle and the wheel.

3. A wheel and axle assembly, comprising a tubular outer axle having a positive shoulder, a fixedly mounted axle housing spacedly surrounding a portion of the outer axle, a collar anchored to the housing and having a tubular sleeve portion of one diameter tightly embracing a portion of the outer axle within the housing and having an end thereof abutting said outer axle shoulder, said collar having a tubular portion of a second diameter, a spider telescopically enclosing another portion of the outer axle and extending into the last-mentioned collar portion and having an internal splined connection therewith, adjustable and removable means on the outer end portion of the outer axle and engaging the spider to retain it in a desired position of axial adjustment relative to the outer axle, a wheel revolubly mounted on said spider, a driven inner axle extending revolubly through said outer axle, and motion transmitting means between the outer end of said inner axle and the wheel.

4. A wheel and axle assembly, comprising a tubular outer axle having a positive shoulder, a fixedly mounted axle housing spacedly surrounding a portion of the outer axle, a collar anchored to the housing and having a tubular sleeve portion of one diameter tightly embracing a portion of the outer axle within the housing and having an end portion thereof abutting said outer axle shoulder to prevent axial displacement of the outer axle in an outward direction, said collar having a tubular portion of a second diameter, a spider telescopically enclosing another portion of the outer axle and extending into the last-mentioned collar portion and having an internal splined connection therewith, adjustable and removable means on the outer end portion of the outer axle and engaging the spider to retain it in properly adjusted splined connection with the collar and to prevent axial displacement of the outer axle in the other direction, a wheel revolubly mounted on said spider, a driven inner axle extending revolubly through said outer axle, and motion transmitting means between the outer end of the inner axle and the wheel.

HENRY C. FRENCH.
ROBERT T. HENDRICKSON.